United States Patent [19]

Janne

[11] Patent Number: 5,382,198
[45] Date of Patent: Jan. 17, 1995

[54] HELICALLY GROOVED MULTI-RIBBED POWER TRANSMISSION BELT

[75] Inventor: Michel L. Janne, Raymond, Nebr.

[73] Assignee: The Goodyear Tire & Rubber Company, Akron, Ohio

[21] Appl. No.: 187,335

[22] Filed: Jan. 26, 1994

[51] Int. Cl.⁶ .............................................. F16G 5/20
[52] U.S. Cl. ................................... 474/205; 474/240; 474/247
[58] Field of Search ................ 474/202, 205, 249–252, 474/238, 240, 241, 242, 246, 247; 156/138

[56] References Cited

U.S. PATENT DOCUMENTS

| | | | |
|---|---|---|---|
| 4,011,766 | 3/1977 | Waugh | 474/250 X |
| 4,034,615 | 7/1977 | Brooks | 474/250 |
| 4,311,474 | 1/1982 | Standley | 474/205 |
| 5,055,090 | 10/1991 | Miranti | 474/250 X |
| 5,209,705 | 5/1993 | Gregg | 474/205 X |
| 5,211,608 | 5/1993 | Wong et al. | 474/202 |

FOREIGN PATENT DOCUMENTS

| | | | |
|---|---|---|---|
| 14014 | 8/1980 | European Pat. Off. | 474/250 |
| 611975 | 11/1932 | Germany | 474/249 |
| 4016469 | 11/1991 | Germany | 474/250 |
| 452982 | 3/1935 | United Kingdom | 474/250 |
| 581025 | 5/1944 | United Kingdom | 474/250 |

*Primary Examiner*—Roger J. Schoeppel
*Attorney, Agent, or Firm*—Marc R. Dion, Sr.

[57] ABSTRACT

A multi-ribbed power transmission belt having transverse grooves in the compression section which are oriented other than perpendicular to the longitudinal direction of the belt such that any transverse grooves in immediately adjacent longitudinal ribs are offset from each other in the longitudinal direction by a distance of from 10% to 50% of the longitudinal spacing of the grooves.

2 Claims, 1 Drawing Sheet

HELICALLY GROOVED MULTI-RIBBED POWER TRANSMISSION BELT

FIELD OF THE INVENTION

This invention relates to multi-ribbed power transmission belts designed to minimize noise while in operation.

BACKGROUND OF THE INVENTION

A number of power transmission belts having a variety of grooved constructions are known. U.S. Pat. No. 4,011,766 discloses a belt consisting of multiple belt elements connected with a tie band. The individual elements have transverse grooves perpendicular to the sides of the belt. The grooves on adjacent belt elements are staggered and, optionally, spaced differently to eliminate hinge points and provide some noise randomization. There is no attempt made to minimize the noise generated by each individual belt element. While this concept is practical for belts constructed of individual belt elements which can have the grooves formed prior to assembly, it is not practical for multi-ribbed belts which are built as a single unit and machine formed, which is currently the state of the art method for forming most automotive and industrial multi-ribbed belts.

U.S. Pat. No. 4,034,615 discloses a single V-belt having angled grooves. While this reduces the noise generated by each groove, it does not provide the noise cancellation that can be achieved by having multiple sources of the same frequency operating out of phase with each other. Additionally, this patent does not disclose multi-ribbed belts.

U.S. Pat. No. 5,055,090 discloses grooved multi-ribbed belts having randomized grooved spacing and/or depth. While this serves to distribute the noise over a wider frequency range, it does not significantly reduce overall noise. In addition, this method is at a disadvantage to the helical groove design, because some grooves are longer or shallower than would be optimum for maximum flex life. The long or shallow grooves have higher stress concentrations and are the first areas to crack or chunk out. Finally, the grooves are perpendicular to the bending direction, creating hinge points. This increases the tendency of single rib cracks to propagate across the entire belt width.

U.S. Pat. No. 5,209,705 discloses a single synchronous drive belt having at least two adjacent rows of teeth which are at oppositely balanced oblique angles to the longitudinal direction of the belt. In addition, the center lines of the teeth in the adjacent rows are offset from each other by a distance of up to 10% to 90% of their pitch.

U.S. Pat. No. 5,211,608 discloses a positive drive timing belt having spiral grooves cut into the teeth in order to allow air pockets to escape in all directions.

The invention being disclosed herein improves on the prior art by optimizing noise cancellation by controlling the phase angle between the noise sources of each individual rib and reducing the noise generated by each rib by setting transverse grooves at an angle other than perpendicular to the longitudinal direction of the belt. It further uses a constant transverse groove depth to equalize the stresses on each groove and to eliminate any hinge points.

SUMMARY OF THE INVENTION

In accordance with the practice of the present invention, there is provide a multi-ribbed power transmission belt comprising a tension section, a load carrying section and a compression section. The compression section has a plurality of longitudinal ribs and a plurality of parallel transverse grooves longitudinally spaced by a Pitch P. The transverse grooves are oriented at an angle $\alpha$ other than perpendicular to the longitudinal direction and such that any transverse grooves in immediately adjacent longitudinal ribs are offset from each other in the longitudinal direction by a distance of from 10% to 50% of the Pitch P.

DESCRIPTION OF THE INVENTION

Figure 1:
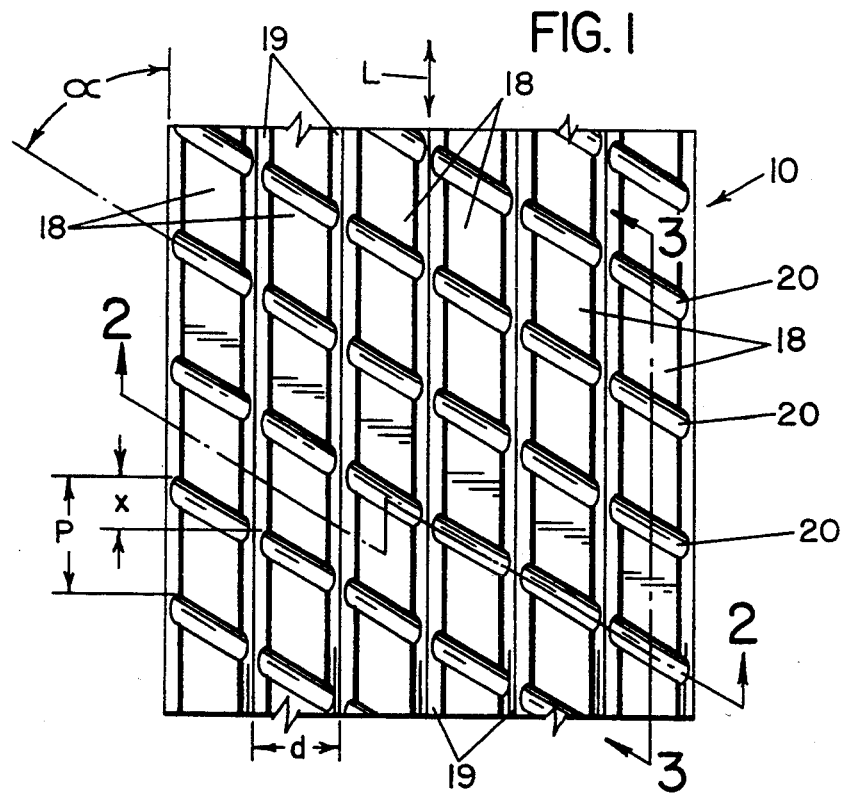
FIG. 1 is a bottom plan view of a section of the belt of this invention.
Figure 2:
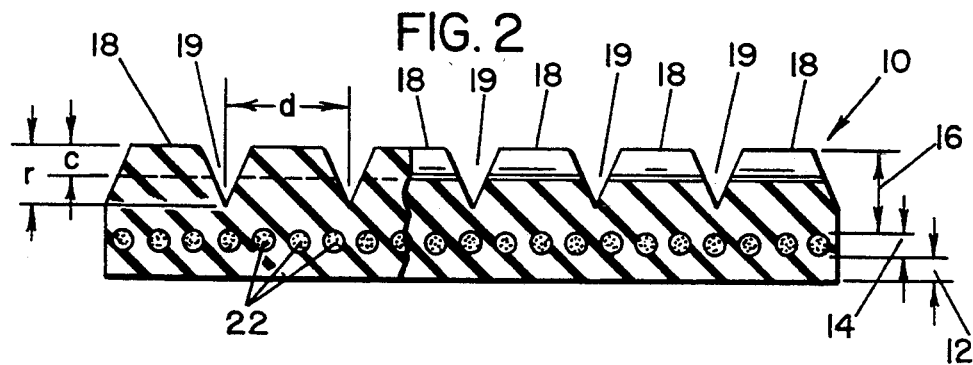
FIG. 2 is an enlarged view of the belt taking along the line to 2—2 of FIG. 1.

The multi-ribbed power transmission belt shown generally at 10, has a tension section 12, a load carrying section 14, and a compression section 16. Said compression section has a plurality of longitudinal ribs 18 and a plurality of parallel transverse grooves 20 longitudinally spaced by a pitch P. The transverse grooves 20 are oriented at an angle $\alpha$ other than perpendicular to the longitudinal direction L and such that any transverse grooves 20 in adjacent longitudinal ribs 18 are off-set from each other in the longitudinal direction L by a distance x of from 10% to 50% of the pitch P.

Figure 3:
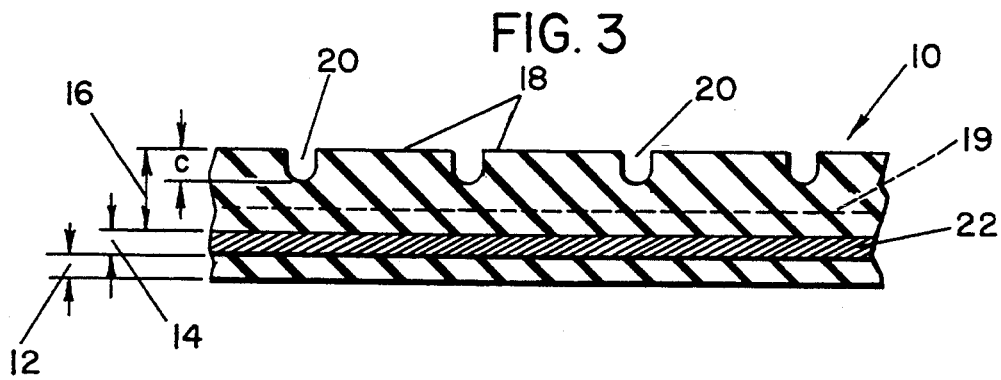
FIG. 3 is an enlarged view of the belt taken along line 3—3 of FIG. 1.

The angle $\alpha$ of the transverse grooves 20 is from 20° to 85°, depending mainly on the pitch P, the offset of the grooves x, and the spacing between the longitudinal grooves d and the number of ribs. While the number of ribs shown in the drawings is six, it should be appreciated that a multi-ribbed transmission belt may contain anywhere from three upwards to thirty or more. While the grooves 20 are illustrated in FIG. 3 as being U shaped, it should be appreciated that they could also be V shaped or V shaped with a rounded bottom or any other convenient shape. The depth of the transverse grooves c and the longitudinal grooves r can be the same or can be different. The depth of the longitudinal grooves r is generally greater than the depth of the transverse grooves c but not so deep as to cut into the longitudinal reinforcing cords 22.

The belt of this invention is illustrated in the drawings as being elastomeric. The elastomers may be any one of those known to be suitable for use In such belts, e.g., polychloroprene, polyurethane, NBR, IIR, IR, SBR, CSM, EPDM, other thermosets, thermoplastic elastomers and other polymer alloys.

The load carrying section 14 of this belt can be made of any suitable material and used in any suitable technique known in the art. Preferably, the load carrying section 14 is made of a helically wound load carrying cord 22 having individual turns thereof arranged in substantially equally spaced relation across the belt body. These cords may be made from glass fibre, carbon fibre, steel, polyester, high tenacity rayon or polyaramide.

The preferred method of manufacturing the belt of this invention is to build the belt inverted on a rigid mandrel of the proper diameter. A layer of tension stock is first applied to the mandrel followed by the helical windings of the reinforcing cord 22. Then a layer of cushion stock is applied over the reinforcing cord 22. The angular grooves 20 are molded into the product at the time of cure by means of a flexible diaphragm having the helical pattern opposite that of the grooves placed around the cushion stock and compressed against the product by steam pressure, air pressure, or other means. Following the curing process, the longitudinal grooves are then formed in the conventional manner by machining, grinding, etc.

What is claimed is:

1. A multi-ribbed power transmission belt 10 comprising a tension section 12, a load carrying section 14, and a compression section 16, said compression section having a plurality of longitudinal ribs 18, and a plurality of parallel transverse grooves 20 longitudinally, spaced by a Pitch P, wherein the transverse grooves 20 are oriented at an angle $\alpha$ other than perpendicular to the longitudinal direction L and such that any transverse grooves 20 in adjacent longitudinal ribs are offset from each other in the longitudinal direction L by a distance x of from 10% to 50% of the Pitch P.

2. The belt according to claim 1 wherein the angle $\alpha$ of the transverse grooves is from 20° to 85°.

* * * * *